(12) United States Patent
Lymer et al.

(10) Patent No.: US 6,326,940 B1
(45) Date of Patent: Dec. 4, 2001

(54) FERROELECTRIC LIQUID CRYSTAL DEVICES

(75) Inventors: Karl Philip Lymer, Malvern Link; John Clifford Jones, Leigh Sinton, both of (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/340,302

(22) Filed: Jun. 28, 1999

(30) Foreign Application Priority Data

Jun. 27, 1998 (GB) ................................................. 9813839

(51) Int. Cl.$^7$ ....................................................... G09G 3/36
(52) U.S. Cl. ............................... 345/87; 345/97; 349/133
(58) Field of Search ................................. 345/87–88, 94, 345/96–97, 208, 209, 204, 100; 349/123, 133–134; 252/299.01, 299.61; 428/1.1, 1.25

(56) References Cited

U.S. PATENT DOCUMENTS 5,644,371  7/1997  Koden et al. ........................ 349/110

FOREIGN PATENT DOCUMENTS 0809133  11/1997 (EP).
2315876   2/1998 (GB).

OTHER PUBLICATIONS

Search Report for GB 9813839.9; Dated Oct. 5, 1998.

Primary Examiner—Richard Hjerpe
Assistant Examiner—Francis Nguyen
(74) Attorney, Agent, or Firm—Renner, Otto, Boisselle & Sklar, LLP (57) ABSTRACT

A ferroelectric liquid crystal display includes a cell comprising a layer of ferroelectric liquid crystal material contained between two transparent glass substrates having alignment layers for determining the surface alignment of the molecules in the liquid crystal material. The display further incorporates switching circuitry for switching the molecules in the liquid crystal material between a first state and a second state by means of a switching signal having a duration $\tau$ and a voltage V. The liquid crystal material and the alignment layers are such that the cell exhibits a $\tau$-V response in the form of a curve having two minima separated by an intermediate maximum. Such a $\tau$-V response, which may be termed a double turnaround response, allows a high degree of discrimination between the switched and non-switched states beyond the turnaround point and offers potential addressing advantages.

11 Claims, 9 Drawing Sheets

FERROELECTRIC LIQUID CRYSTAL DEVICES

This invention relates to ferroelectric liquid crystal devices.

The surface stabilised ferroelectric liquid crystal device (SSFLCD) possesses the advantage over other liquid crystal devices, such as the twisted nematic liquid crystal device, that it is a bistable device which can be switched between two states by switching pulses of opposite polarity. It is switched into one state by a pulse of one polarity and will remain in that state until a switching pulse of opposite polarity is applied to switch it to the opposite state. By contrast, in operation of a twisted nematic liquid crystal device, a drive signal must be applied continuously to maintain the device in one of its states. SSFLCD's are of particular interest in multiplexed applications as the level to which such devices can be multiplexed is not restricted by the electro-optic characteristic of the device.

As is well known, a conventional SSFLCD typically includes a layer of chiral smectic C* ferroelectric liquid crystal material contained between two parallel transparent substrates provided on their inside surfaces with electrode structures in the form of row and column electrode tracks which cross one another to form an addressable matrix array of pixels. Such pixels are typically addressed on a line-by-line basis by applying data pulses in parallel to the column electrode tracks, each data pulse being either a selection pulse or a non-selection pulse, and by sequentially applying strobe pulses to the row electrode tracks so as to switch selected pixels along each row from one state to the other under the effect of the electric field produced by the voltage difference between the data pulse and the strobe pulse applied to the relevant electrode tracks. In certain addressing schemes, a blanking pulse is applied sequentially to the row electrode tracks of such a voltage and duration as to set all the pixels along each row to one state, irrespective of the data pulses applied to the column electrode tracks. Subsequent application of strobe and data pulses may then be used to switch selected pixels to the other state whilst leaving the remaining pixels in the one state. Addressing schemes of this type are described in Surguy, Ayliffe, Birch, Bone, Coulson, Crossland, Hughes, Ross, Saunders and Towler, "The Joers/Alvey, Ferroelectric Multiplexing Scheme", Ferroelectrics, 1991, Vol. 122, pp. 63–79.

The interaction between the strobe and data waveforms needs to be carefully controlled to ensure that those pixels which require to be switched are switched successfully and those pixels which are to remain in the same state are not affected by either the strobe pulses or the data pulses applied to them during addressing of the other pixels in the array. This problem is exacerbated by the particular temperature sensitivity of SSFLCD's and by manufacturing inhomogeneities, such as variations in the surface roughness and variations in the cell spacing, which may occur across the width of a device, particularly a large area display. The switching margin, that is the part of the switching characteristic of the device which discriminates between the switched and non-switched states in dependence on the applied switching signal, is reduced by the above factors.

It is an object of the invention to provide a ferroelectric liquid crystal device having a switching response which allows a high degree of discrimination between the switched and non-switched states.

According to the present invention there is provided a ferroelectric liquid crystal device including a cell comprising a layer of ferroelectric liquid crystal material contained between two substrates having at least one alignment layer for determining the surface alignment of the molecules in the liquid crystal material, and addressing means for switching the molecules in the liquid crystal material between a first state and a second state by means of a switching signal, wherein the liquid crystal material and the alignment layer are such that the cell exhibits a $\tau$-V response in the form of a curve having two minima separated by an intermediate maximum (which may be termed the intermediate maximum point), where a ferroelectric liquid crystal device including a cell comprising a layer of ferroelectric liquid crystal material contained between two substrates having at least one alignment layer for determining the surface alignment of the molecules in the liquid crystal material, and addressing means for switching the molecules in the liquid crystal material between a first state and a second state by means of a switching signal, wherein the liquid crystal material and the alignment layer are such that the cell exhibits a $\tau$-V response in the form of a curve having two minima separated by an intermediate maximum, where $\tau$ denotes the duration and V denotes the voltage of a switching pulse.

Such a $\tau$-V response, which may be termed a double turnaround response, allows a high degree of discrimination between the switched and non-switched states beyond the turnaround point and offers potential addressing advantages, as will be appreciated more fully from the following description.

In order that the invention may be more fully understood, a preferred SSFLCD in accordance with the invention will now be described, by way of example, with reference to the accompanying drawings, in which:

FIGS. 8(*a*) and 8(*b*) diagrammatically compare the effect on the multiplex operating window of parallel addressing for a conventional SSFLCD (FIG. 8(*a*)), and a SSFLCD of the invention (FIG. 8(*b*)), FIG. 8(*c*) illustrating the switching effect for single turnaround and double turnaround and FIG. (*d*) illustrating a schematic parallel addressing waveform;

FIGS. 10(*a*) and 10(*b*) are graphs comparing the $\tau$-V characteristics of the SSFLCD of the invention and the conventional SSFCLD using JOERS/Alvey select and non-select voltage pulses.

Figure 1:
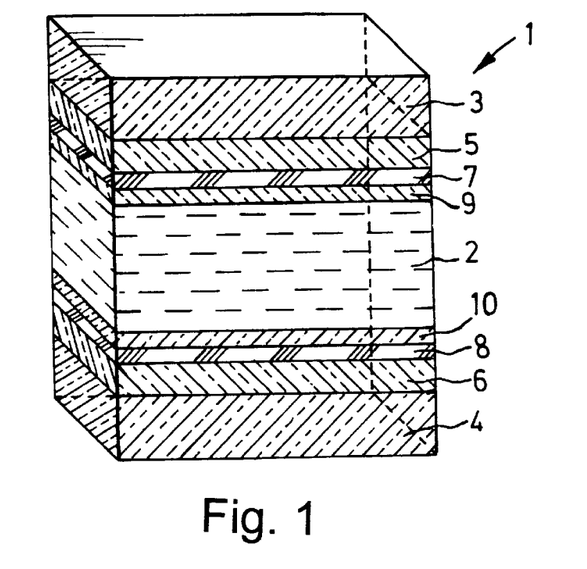
FIG. 1 is a section through a cell of the SSFLCD.

FIG. 1 shows a SSFLCD cell 1 in which a layer of ferroelectric liquid crystal material 2 in the chiral smectic C* phase is contained between two transparent glass substrates 3 and 4 spaced apart by spacers (not shown) so as to extend parallel to one another. Transparent ITO (indium tin oxide) electrode structures 5 and 6 are applied to the inwardly directed faces of the substrates 3 and 4. In one possible configuration each of the electrode structures 5 and 6 is in the form of electrode tracks arranged parallel to one another, the tracks of the structure 5 being arranged in rows and the tracks of the structure 6 being arranged in columns extending perpendicularly to the rows so as to enable pixels at the intersection of the rows and columns to be addressed by application of suitable strobe and data pulses to the appropriate intersecting tracks of the electrode structures 5 and 6.

There are further applied to the inside surfaces of the substrates 3 and 4, and the electrode structures 5 and 6 provided thereon, insulating films 7 and 8 and rubbed alignment layers 9 and 10. Each alignment layer 9, 10 is formed of a material such as a polyimide and is rubbed to impart a preferred alignment to the molecules of the liquid crystal material 2 in the vicinity of the alignment layers 9, 10, for example by buffing with a soft cloth made of rayon in a required rubbing direction. Typically the alignment layer 9 or 10 imparts a pretilt of about 2° to 10° to the surface, and the rubbing directions of the two layers 9, 10 are parallel and in the same direction. The liquid crystal material is aligned during manufacture by cooling through the higher temperature phases to the required chiral smectic C* phase. As is well known the liquid crystal molecules, when in the chiral tilted smectic C* phase, are uniformly aligned in microlayers extending perpendicularly to the substrates 3, 4 with the molecules in each microlayer adopting a chevron geometry due to the alignment of the molecules with the substrates 3, 4 on both sides of the liquid crystal layer. The cell is positioned between two polarisers (not shown) with polarising directions orientated relative to one another such as to provide a dark appearance when the liquid crystal material is in one switched state and a light appearance when the liquid crystal material is in the other switched state.

Figure 2:
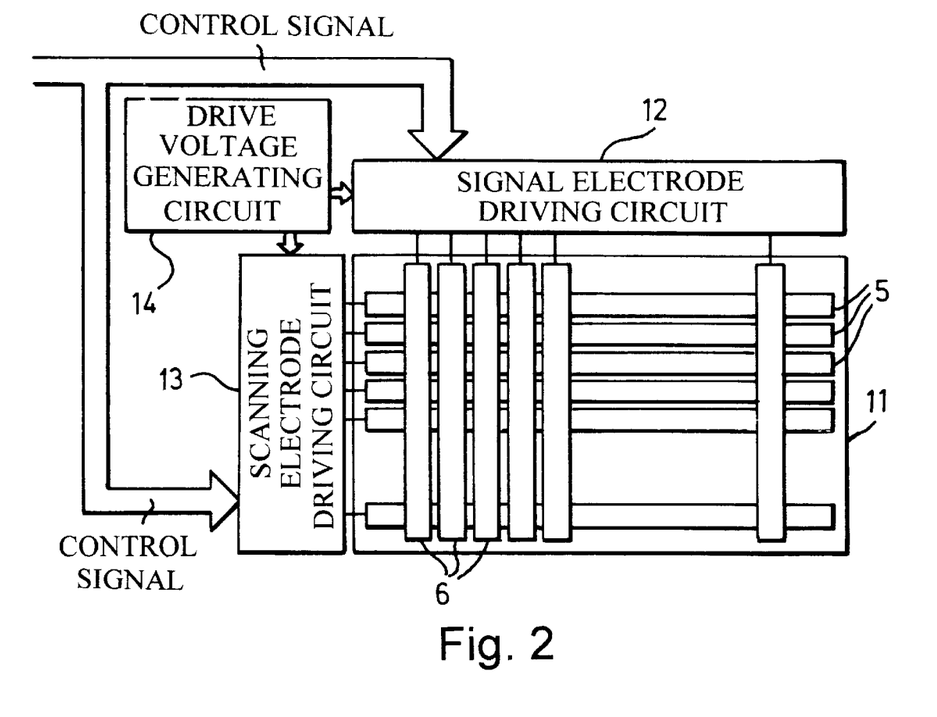
FIG. 2 is a block diagram of the drive circuitry of the SSFLCD.

FIG. 2 schematically shows addressing circuitry for a liquid crystal display panel 11 having a cell structure as described above and incorporating a row electrode structure 5 and a column electrode structure 6. In order to address the individual pixels of the liquid crystal panel 11, the circuitry comprises a signal electrode driving circuit 12 for applying data signals to the column electrode tracks 6, and a scanning electrode driving circuit 13 for applying scanning signals to the row electrode tracks 5, as well as a drive voltage generating circuit 14. The signal electrode driving circuit 12 and the scanning electrode driving circuit 13 produce data and scanning signals based on a variable voltage generated by the drive voltage generating circuit 14 with a pulse width and timing determined by control signals supplied to the circuits 12 and 13.

Figure 5:
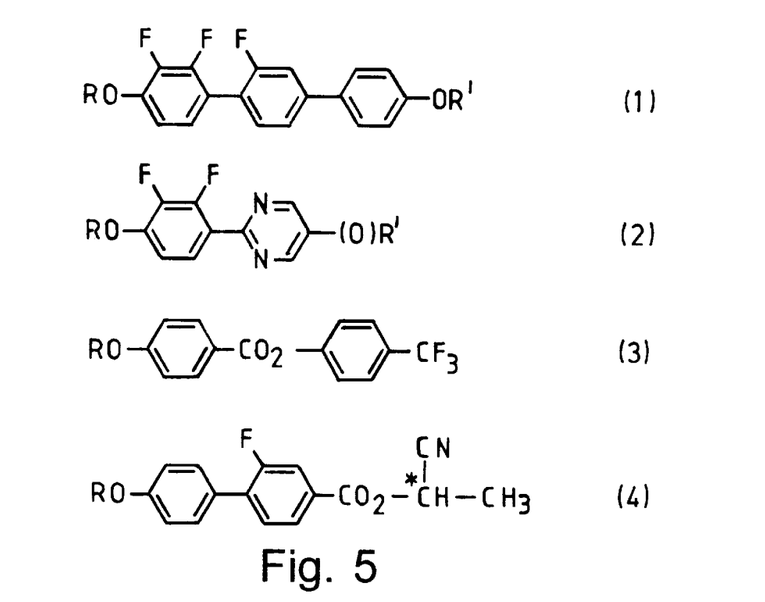
FIG. 5 shows the chemical structures of the materials used in the liquid crystal material of the SSFLCD.

In the preferred SSFLCD of the invention, the liquid crystal material 2 comprises a high dielectric biaxiality (high Ps and high cone angle) chiral smectic C* liquid crystal mixture, for example KPL3 having components with chemical structures as shown diagrammatically in FIG. 5, namely (1) trifluoroterphenyl, (2) difluorophenylpyrimidine, (3) a smectic-A inducer, and (4) a chiral dopant. KPL3 has a phase behaviour:

$$S_C^* \ 75.9 \ S_A \ 78.1 \ N^* \ 86.1 \ I$$

where $S_C^*$ denotes the chiral smectic C* phase $S_A$ denotes the smectic A phase $N^*$ denotes the nematic phase I denotes the isotropic phase and the given values denote the intervening phase transition temperatures. It should be noted that these values were taken on heating at 2 degrees a minute and that the onset temperatures are quoted.

Furthermore the alignment layers 9 and 10 are of Ciba Geigy Probimide 32 (PI32). The effect of utilising the KPL3 mixture with parallel rubbed alignment layers of such a material is to ensure alignment of the liquid crystal molecules when in the chiral smectic C* phase exclusively in the half splayed state C1T (see FIG. 11), and to provide a τV characteristic exhibiting the double turnaround effect, as will now be described with reference to the graph of FIG. 4 showing a series of measurements indicating the τV response of such a SSFLCD having polyimide alignment layers, as compared with the τV response of a standard SSFLCD utilising the same liquid crystal mixture in a cell having Nylon alignment layers (Nylon is a registered trademark) where the molecules are uniformly aligned, that is not in the half splayed state referred to above.

Figure 11:
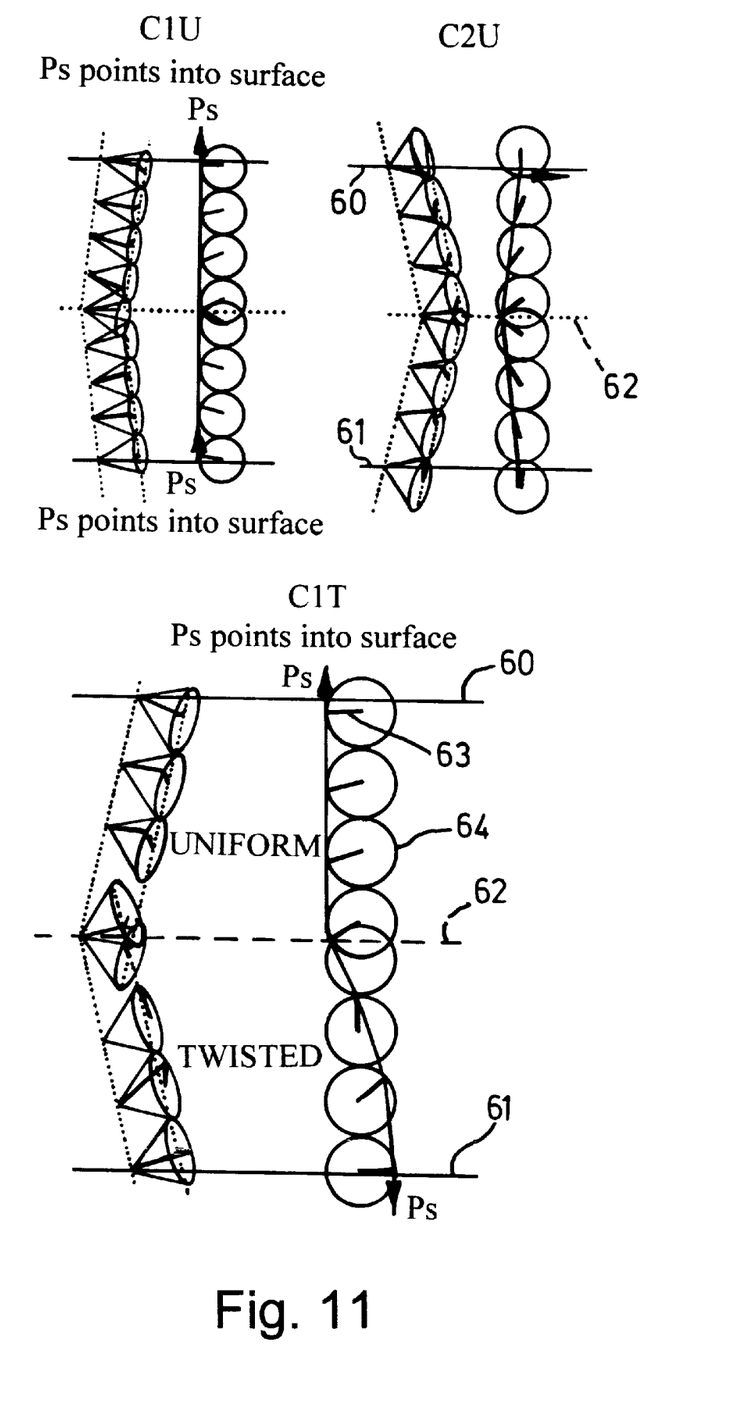
FIG. 11 is an explanatory diagram illustrating the C1U, C2U and C1T geometries.

FIG. 11 diagrammatically illustrates three of the possible alignments C1U, C2U and C1T of the liquid crystal molecules between the alignment surfaces 60 and 61 of the two substrates, with two views along mutually perpendicular directions being shown in each case, and with the spontaneous polarisation vector Ps pointing in the direction shown in each case. The chevron interface is shown at 62 in each case. The formation of the half splayed chevron structure C1T derives from the polar surface/liquid crystal dipole moment interaction which results in the vector Ps pointing into the alignment surface of both substrates. This causes one arm of the smectic C* chevron geometry to become splayed as the liquid crystal director 63 processes around the smectic C* cone 64 to satisfy the boundary conditions at the chevron interface 62 and the alignment surfaces 60 and 61.

Figure 4:
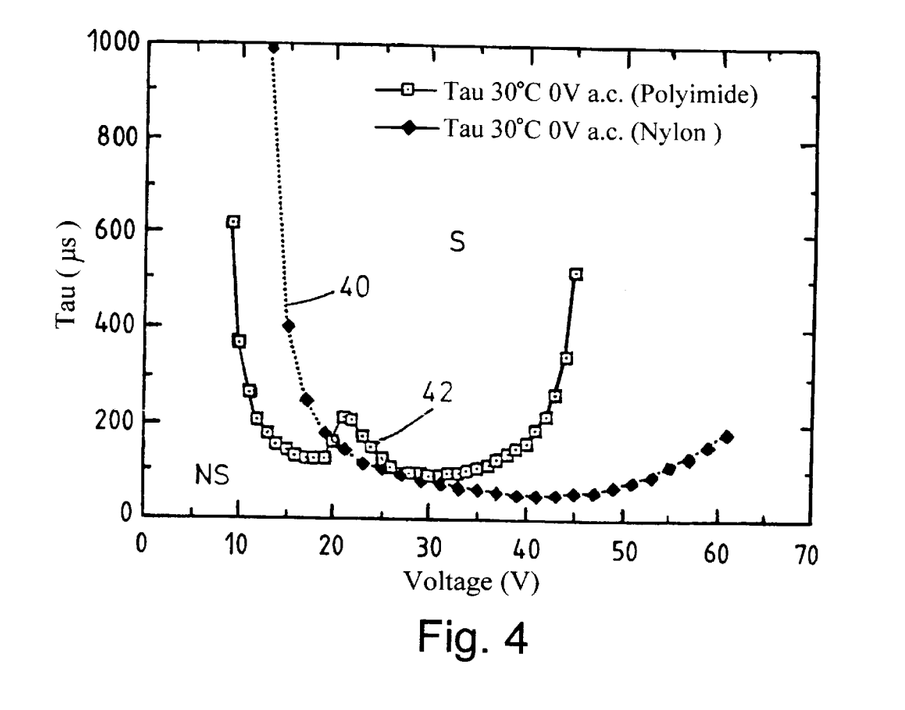
FIG. 4 is a graph of the $\tau$-V characteristics of SSFLCDs exhibiting both single turnaround and double turnaround effects.

Referring to FIG. 4 the standard SSFLCD has a τV curve 40 in which the duration τ of the switching pulse required to switch the material from the one state to the other state decreases as the magnitude V of the pulse increases until a $\tau_{min}$ value is reached at V≈40V. For higher values of V the switching time τ required to switch the material between states increases as the magnitude V of the pulse increases.

By comparison the SSFLCD of the invention exhibiting the double turnaround effect has a τV curve 42 in which the duration τ of the pulse required to switch between states initially decreases with increasing voltage until a $\tau_{min1}$ value is reached at V≈20 above which the switching duration τ increases with increasing voltage until an intermediate maximum value is reached at the intermediate maximum point V≈22V. The pulse duration τ required for switching then again decreases with increasing voltage until a second minimum value $\tau_{min2}$ is reached at V≈30V. Thereafter the pulse duration τ increases with increasing voltage V in such a manner that the switching speed is considerably slower at voltages V of about 40V as compared with the SSFLCD in the uniform state C1U/C2U with Nylon alignment layers producing the τ-V response 40 which does not exhibit the double turnaround effect. The double turnaround effect derives from the asymmetry present in the half splayed state C1T of the liquid crystal material obtained when using PI32 for the alignment layers of the cell.

As is well known, when the SSFLCD material is in the chiral smectic C* phase, the liquid crystal molecules align themselves between the substrates in chevron-shaped layers as a consequence of the strong anchoring forces applied by the alignment layers which hold the molecules at a particular alignment at the walls of the cell but which have a diminishing effect at greater distances from the walls. Furthermore the directors of the molecules tend to lie as if on the surface of a cone 30 as shown at (a) in FIG. 3, each molecule having a dipole moment (usually provided by a polar molecular group arranged on one side of the molecule) substantially perpendicular to the director. Thus an electric field applied between the walls of the cell will couple with the dipole moment to switch the directors from a first stable state 31 to a second stable state 32, thus altering the appearance of the cell observed through polarisers. The switching of the directors may be visualised as rotation of each director around the cone 30, and the starting and finishing points of the director on this cone 30 play an important part in determining the speed at which the cell will switch. The positions 31 and 32 correspond to the two fully switched positions of the director, with the polarisation of the director in each case being shown by $P_s$ and $P'_s$. In practice the director will not occupy these fully switched positions in the two switched states of the cell due to alignment geometry constraints.

Figure 3A:
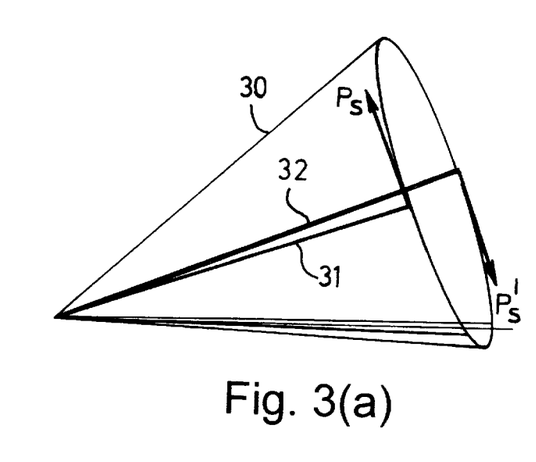
FIG. 3 diagrammatically shows the orientation of the liquid crystal molecules of the SSFLCD.
Figure 3B:
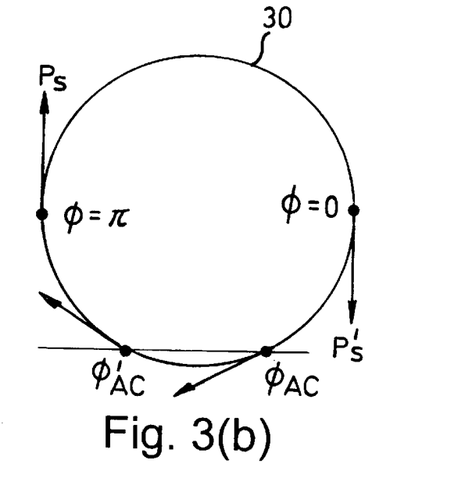

FIG. 3 also shows at (b) an end view of the cone 30 showing the fully switched positions of the director at $\phi=0$ and $\phi=\tau$. The director will only occupy these positions under the effect of an applied electric field of suitable polarity and magnitude. When such an electric field is not applied the director will relax around the cone away from the fully switched position to some extent. Furthermore, under the effect of an applied a.c. stabilisation voltage, the director will occupy a position $\phi_{AC}$ or $\phi'_{AC}$ depending on the direction in which the molecule is switched. The a.c. field is continuously applied as a consequence of addressing of the cell by the data signal. However switching of the cell from one state to the other will require application of a d.c. electric field as a result of a voltage pulse of an appropriate magnitude V and duration $\tau$. Once the director has switched to a point half way between the fully switched positions, that is $\pi/2$, the director will move naturally towards the opposite switching position to complete the switching process. Two of the factors that are significant in determining the form of the switching signal are the ferroelectric torque and the dielectric torque which are each related differently to the switching angle of the director and the applied voltage. In addition the dielectric torque acts in the opposite direction to the ferroelectric torque during part of the switching cycle. Thus it will be appreciated that the $\tau V$ switching characteristic can be varied by varying the a.c. stabilisation applied during addressing of the cell.

Figure 7:
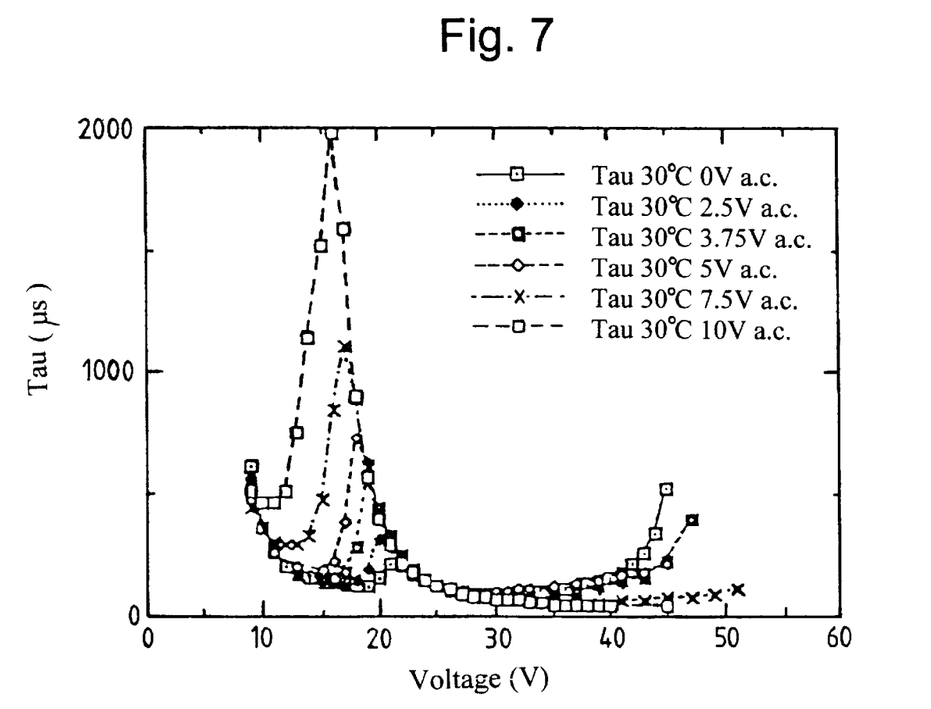

FIG. 7 shows a series of $\tau$-v curves for the SSFLCD previously described exhibiting the double turnaround effect at different levels of a.c. stabilisation from 0V r.m.s. to 10V r.m.s. and at a temperature of 30° C. For the purposes of plotting of the graph of FIG. 7, the a.c. stabilisation was applied as a 50 kHz a.c. waveform superimposed on a standard 100:1 duty cycle waveform in order to approximate a normal addressing scheme. It will be appreciated that the switching time $\tau$ corresponding to the intermediate maximum of the curve is strongly dependent on the level of a.c. stabilisation and increases as the level of a.c. stabilisation increases. Furthermore the voltage V at which the intermediate maximum occurs decreases with increasing a.c. stabilisation. More importantly the switching time $\tau_{min2}$ corresponding to the second minimum of the curve decreases as the level of a.c. stabilisation increases so that, if the device is operated with a switching voltage V in the vicinity of the second minimum, of about 35V for example, the switching time decreases as the a.c. stabilisation level increases. This is a unique feature of the second minimum of devices exhibiting the double turnaround effect, and is the opposite of what would be obtained with a device exhibiting a conventional $\tau V_{min}$ characteristic, such as that shown in FIG. 4, in which an increase in the a.c. stabilisation level would result in an increased switching time. The a.c. response of devices exhibiting the double turnaround effect offers advantages in terms of parallel addressing, as will be described in more detail below.

Figure 6:
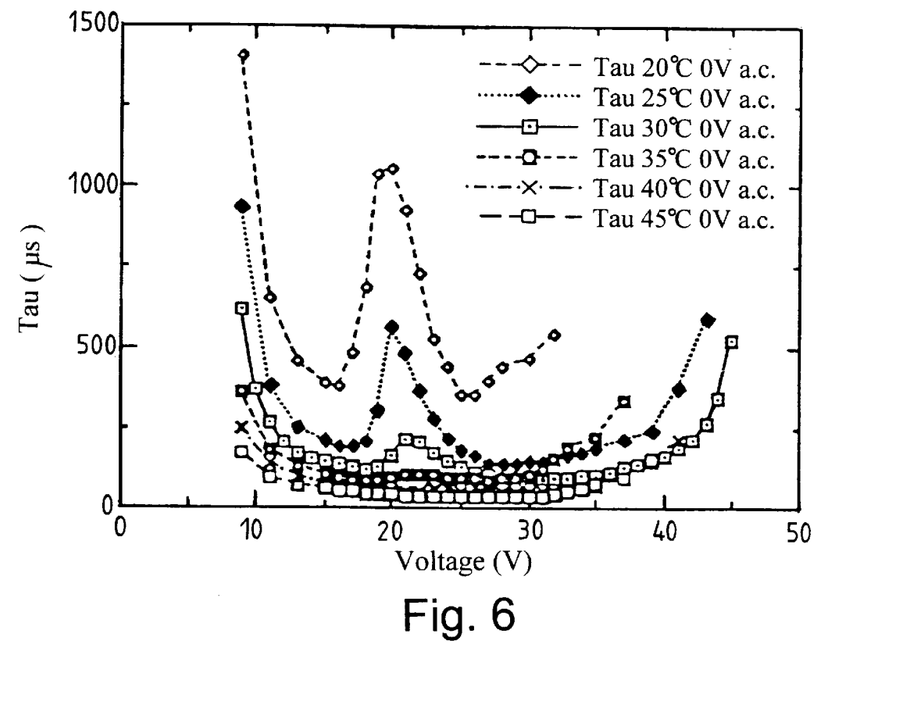
FIGS. 6 and 7 are graphs showing the $\tau$-V characteristic of the SSFLCD for different temperatures and different a.c. biases.

FIG. 6 shows a series of $\tau$-V curves for the SSFLCD exhibiting the double turnaround effect without a.c. stabilisation but at different temperatures between 20° C. and 45° C. As will be seen, the switching time $\tau$ corresponding to the intermediate maximum of the curve decreases with increasing temperature. The double turnaround effect ceases at a temperature of about 40° C.

The manner in which the relative insensitivity of $\tau_{min2}$ to low levels of a.c. bias, and the decrease of $\tau_{min2}$ at high levels of a.c. bias, can be exploited in parallel addressing will now be described with reference to FIGS. 8(a) and (b), which diagrammatically show (a) the $\tau V$ response of a conventional SSFLCD cell with two levels of a.c. stabilisation, a.c. 1 and a.c. 2 (a.c. 1<a.c. 2), and (b) the TV response of a SSFLCD exhibiting the double turnaround effect with similar levels of a.c. stabilisation.

In parallel addressing schemes blocks of pixels are addressed all at one time, as opposed to pixels having to be addressed line-by-line (with those pixels receiving select data signals applied to the columns being switched on application of a strobe signal to the row) as in most conventional SSFLCD addressing schemes. At least one level of a.c. bias is applied to selected pixels of the SSFLCD by parallel addressing techniques disclosed in GB 2293909A in order to precondition the pixels in such a manner as to move the associated $\tau V$ curve so that selectivity is achieved when the preconditioned pixels receive a switching pulse. Thus the important factors to be considered for such parallel addressing so far as the $\tau$-V curve of the device is concerned are as follows:

(1) How fast the liquid crystal material reacts to the a.c. bias change.

(2) To what extent the curve moves for a given a.c. bias change.

Figure 8A:
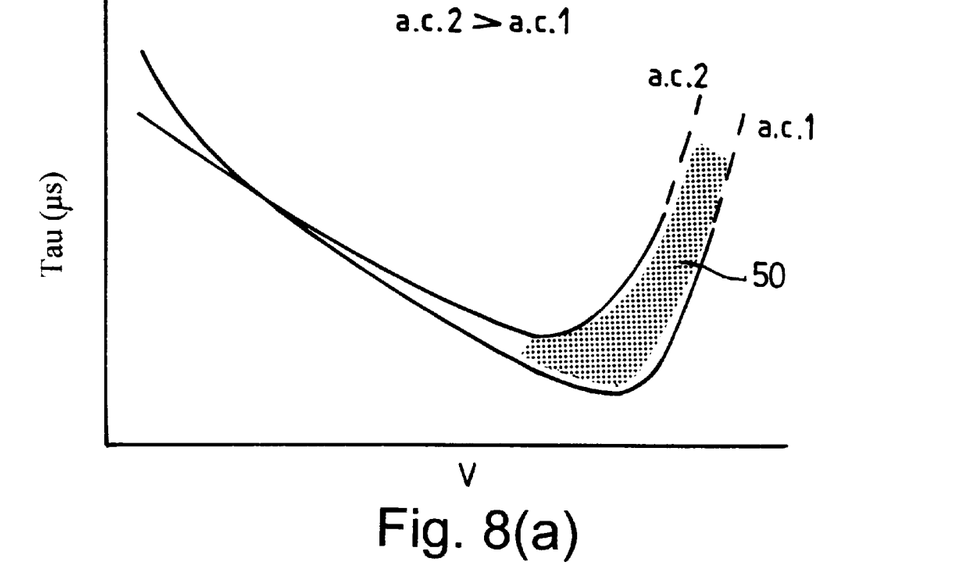
Figure 8B:
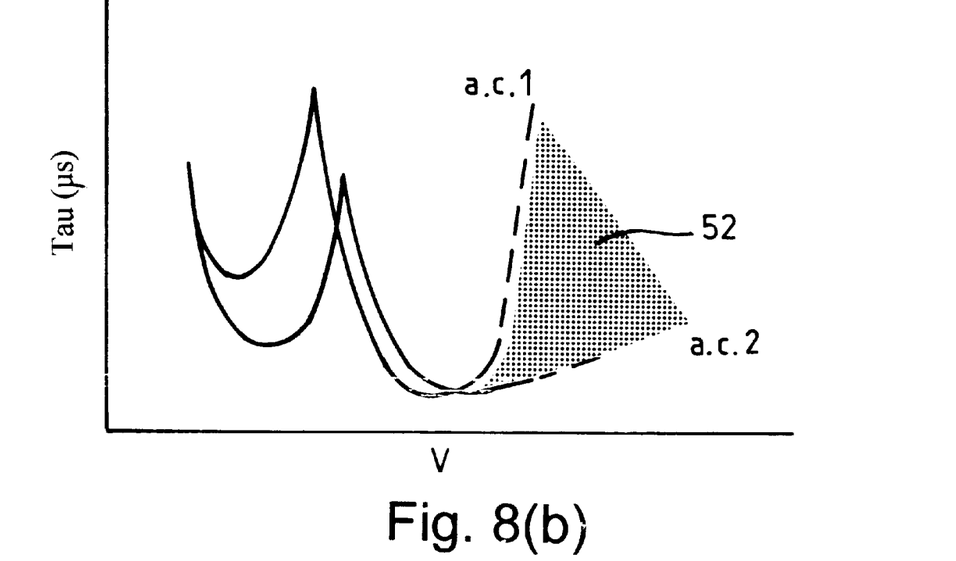
Figure 8C:
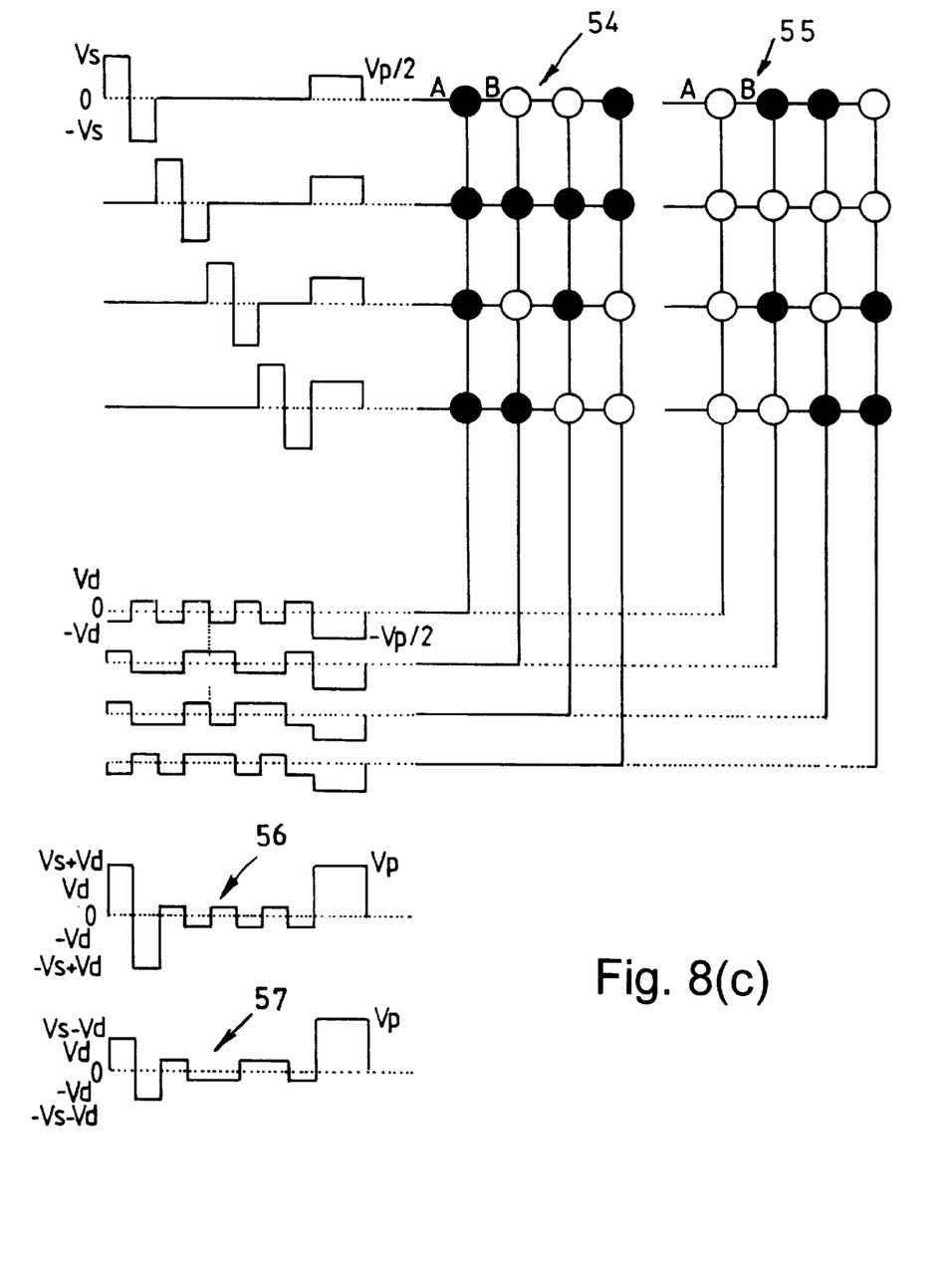

Referring to the diagram of FIGS. 8(a) and 8(c), an a.c. bias of level a.c. 1 is applied to one group of pixels and an a.c. bias of a level a.c. 2 is applied to all other pixels with the result that a pulse of amplitude $V_p$ and width $\tau_p$ will switch all those pixels to which the a.c. 1 bias is applied (in the single turnaround device) but will not switch those pixels to which the a.c. 2 bias is applied. Thus the application of different a.c. bias levels to different pixels in a parallel addressing scheme allows discrimination to be obtained. FIG. 8(c) shows at 54 the results of the combined effects of the two switching waveforms shown applied to a block of pixels in a single turnaround device. All the pixels are dark before the application of the waveforms, and those pixels receiving the lower bias a.c.1 are switched by the pulse Vp to the bright level whereas those pixels receiving the bias a.c.2 are not switched by the pulse.

In order to maximise the effectiveness of parallel addressing, as wide a separation as possible in the $\tau V$ curves corresponding to the different levels of a.c. bias is required. As shown in FIG. 8(a), conventional SSFLCD's offer only a limited margin for parallel addressing due to the fact that the operating region 50 defined by the permitted range of values $\tau_p$, $V_p$ for effecting switching is restricted by the need to avoid interference with the partial switching regions in the vicinity of the curves, and since the switching speed slows down as the a.c. bias level increases (so that the a.c. 2 curve is above the a.c. 1 curve).

By contrast, in the case of a SSFLCD exhibiting the double turnaround effect and being operated in an operating region 52, as shown in FIGS. 8(b) and (c) which shows the $\tau$-V curves at the a.c. bias levels a.c. 1 and a.c. 2 in the vicinity of the second minimum $\tau_{min2}$, operation of the SSFLCD utilising a parallel addressing scheme in the vicinity of the second minimum $\tau_{min2}$ provides two advantages. Firstly the two curves a.c.1 and a.c.2 (where a.c.1<a.c.2) are well separated, thus dramatically increasing the margin for parallel addressing. This therefore allows greater discrimination between the switched state S and non-switched state NS for a given switching speed (or increased switching speed for a given degree of selectivity between the switched state S and non-switched state NS). Secondly as a.c.2 is increased the applied switching pulse may be of a shorter duration since the curve a.c. is moved to faster τ.

FIG. 8(c) shows at 55 the results of the combined effects of the two switching waveforms shown applied to a block of pixels in a double turnaround device. All the pixels are dark before the application of the waveforms, and those pixels receiving the higher bias a.c.2 are switched by the pulse Vp to the bright level whereas those pixels receiving the bias a.c.1 are not switched by the pulse. Also, in FIG. 8(c), there is shown at 56 the resultant at pixel A which receives a high bias a.c.2 followed by a positive switching pulse Vp and at 57 the resultant at pixel B which receives a low bias a.c. 1 followed by a positive switching pulse Vp.

Figure 8D:
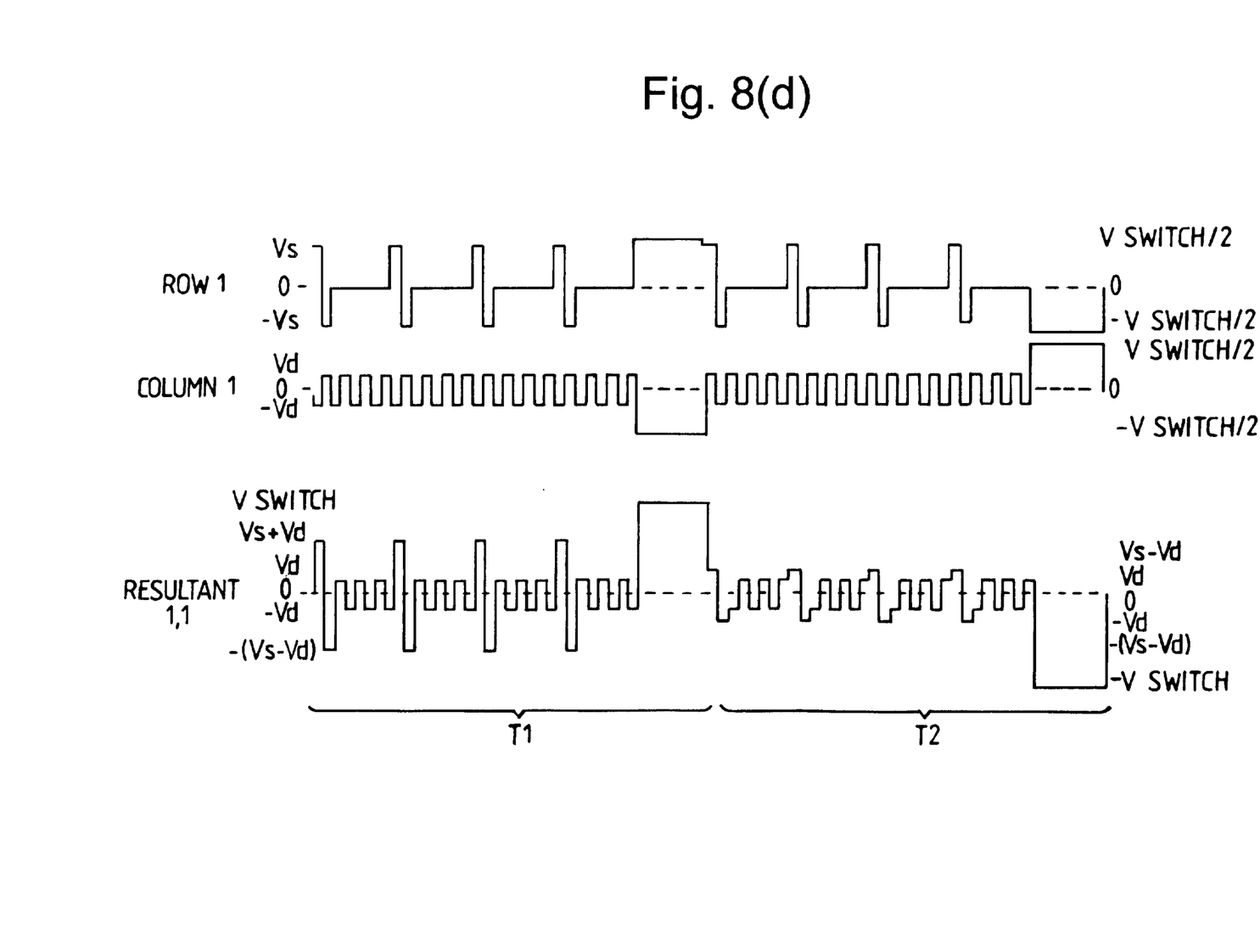

FIG. 8(d) shows the parallel addressing waveforms received by a single pixel (of a device exhibiting a conventional $\tau V_{min}$ characteristic having a single turnaround). Considering the resultant of the waveforms applied to the column and row electrodes, in a first period T1 the pixel receives a high level preconditioning bias and is not switched by a switching pulse, whereas, in a second period T2, the pixel receives a low level preconditioning bias and is switched by a switching pulse. Thus, in a conventional SSFLCD device., switching takes place following receipt of the lower level preconditioning bias.

Accordingly the operation of a SSFLCD exhibiting the double turnaround effect with such parallel addressing provides advantages in terms of improved frame address rates and enhanced selectivity as compared with conventional devices.

Figure 9:
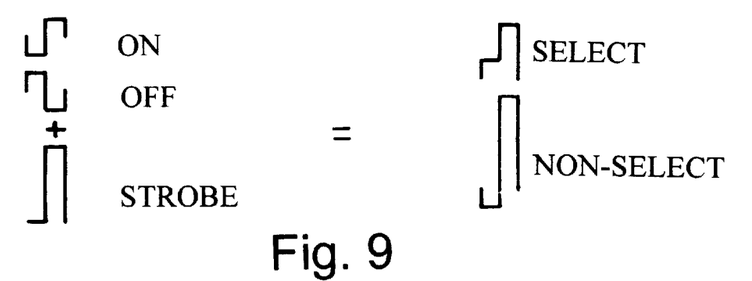
FIG. 9 is an explanatory diagram illustrating the resultant waveforms for the JOERS/Alvey drive scheme.
Figure 10A:
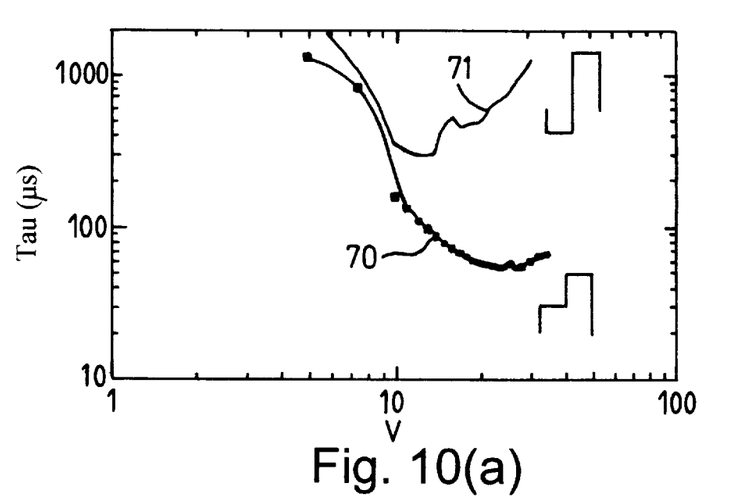
Figure 10B:
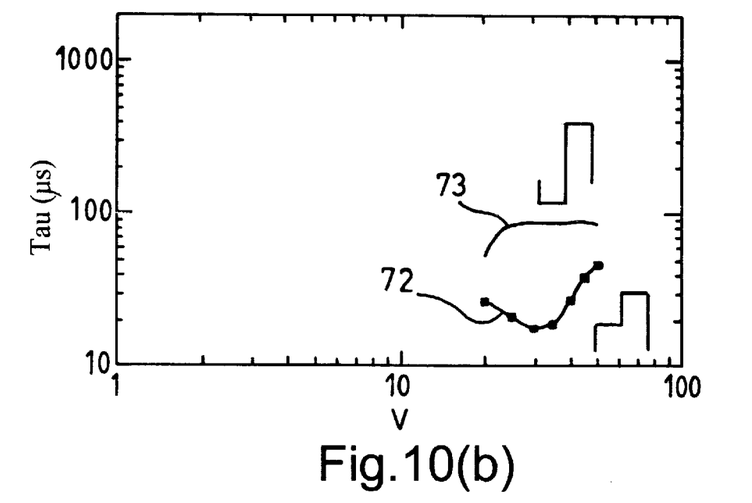

Comparison of the $\tau V_{min}$ characteristics of double turnaround and conventional $\tau V_{min}$ devices (see FIG. 4) shows that the first $\tau V_{min}$ point in the double turnaround characteristic occurs at a lower voltage than the $\tau V_{min}$ point in the single turnaround characteristic. This offers potential advantages in being able to operate a device at lower voltages by addressing at the first minimum of a double turnaround device. In this case the intermediate maximum enhances the low voltage operating region. Such a device may for example be addressed using the JOERS/Alvey addressing drive scheme, which is illustrated diagrammatically in FIG. 9. This shows the SELECT and NON-SELECT resultants obtained by the combination of either an ON data waveform or an OFF data waveform applied to a column electrode whilst a STROBE pulse is applied to the corresponding row electrode. FIG. 10(a) shows the τV curve 70 associated with the SELECT waveform and the τV curve associated 71 with the NON-SELECT waveform at the first minimum of a double turnaround device, whereas FIG. 10(b) shows the τV curve 72 associated with the SELECT waveform and the τV curve associated 73 with the NON-SELECT waveform at the minimum of a conventional $\tau V_{min}$ device. As may be seen in FIG. 10(a) an advantageous operating window shape is defined between the curves 70 and 71 in the double turnaround case.

What is claimed is:

1. A ferroelectric liquid crystal device including a cell comprising a layer of ferroelectric liquid crystal material contained between two substrates having at least one alignment layer for determining the surface alignment of the molecules in the liquid crystal material, and addressing means for switching the molecules in the liquid crystal material between a first state and a second state by means of a switching signal, wherein the liquid crystal material and the alignment layer are such that the cell exhibits a τ-V response in the form of a curve having two minima separated by an intermediate maximum, where τ denotes the duration and V denotes the voltage of a switching pulse.

2. A ferroelectric liquid crystal device according to claim 1, wherein the addressing means is operable to effect switching in the region of the higher voltage minimum of the τ-V curve.

3. A ferroelectric liquid crystal device according to claim 1, wherein the addressing means is adapted to apply an a.c. bias Vac to selected areas of the liquid crystal material, and the switching time $\tau_{min2}$ corresponding to the higher voltage minimum of the τ-V curve decreases as the voltage of the a.c. bias increases.

4. A ferroelectric liquid crystal device according to claim 3, wherein the switching time τ is substantially independent of the applied a.c. bias Vac over a relatively wide voltage range in the vicinity of the higher voltage minimum of the τ-V curve.

5. A ferroelectric liquid crystal device according to claim 3, wherein the switching time τ corresponding to the intermediate maximum of the τ-V curve increases as the voltage of the a.c. bias increases.

6. A ferroelectric liquid crystal device according to claim 1, wherein the switching time τ corresponding to the intermediate maximum of the τ-V curve decreases as the temperature of the liquid crystal material increases.

7. A ferroelectric liquid crystal device according to claim 1, wherein the addressing means is operable to effect switching in the region of the lower voltage minimum of the τ-V curve.

8. A ferroelectric liquid crystal device according to claim 1, wherein the addressing means comprises preconditioning means for preconditioning areas of the liquid crystal material by applying to each area a selected one of two different levels of a.c. bias, and switching means for applying a switching signal to the preconditioned areas to switch those areas preconditioned to one level of a.c. bias from the first state to the second state, whilst not switching those areas preconditioned to the other level of a.c. bias.

9. A ferroelectric liquid crystal device according to claim 1, wherein the addressing means comprises a first set of electrode tracks and a second set of electrode tracks crossing one another at the location of the areas within the liquid crystal material, and means for applying preconditioning and switching waveforms to the first and second sets of electrode tracks to switch selected areas from the first state to the second state.

10. A ferroelectric liquid crystal device according to claim 1, wherein the liquid crystal material is KPL3.

11. A ferroelectric liquid crystal device according to claim 1, wherein the material of the alignment layer is Ciba Geigy Probimide 21 (PI 32).

* * * * *